US012470854B2

(12) United States Patent
Douglas

(10) Patent No.: US 12,470,854 B2
(45) Date of Patent: Nov. 11, 2025

(54) HOME AUDIO WIRING ASSEMBLY

(71) Applicant: Brett Douglas, Karney, NE (US)

(72) Inventor: Brett Douglas, Karney, NE (US)

( * ) Notice: Subject to any disclaimer, the term of this patent is extended or adjusted under 35 U.S.C. 154(b) by 189 days.

(21) Appl. No.: 18/376,315

(22) Filed: Oct. 3, 2023

(65) Prior Publication Data

US 2025/0113129 A1 Apr. 3, 2025

(51) Int. Cl.
*H04R 1/02* (2006.01)
*H04R 3/12* (2006.01)

(52) U.S. Cl.
CPC ............... *H04R 1/025* (2013.01); *H04R 3/12* (2013.01); *H04R 2201/021* (2013.01)

(58) Field of Classification Search
CPC .... H04R 1/025; H04R 3/12; H04R 2201/021; H04R 2201/025; H04R 1/2892; H04R 227/005
See application file for complete search history.

(56) References Cited

U.S. PATENT DOCUMENTS

| | | | |
|---|---|---|---|
| D472,887 S | 4/2003 | Right | |
| 6,845,840 B2 | 1/2005 | Cowan | |
| 10,090,119 B2 * | 10/2018 | O'Keeffe | H04R 1/023 |
| 11,240,574 B2 | 2/2022 | Milne | |
| 11,277,687 B1 | 3/2022 | Stidsen | |
| 11,457,296 B2 * | 9/2022 | Ebeling | H02G 3/14 |
| 2010/0115562 A1 * | 5/2010 | Koike | H04R 27/00 725/78 |
| 2014/0126742 A1 | 5/2014 | Eggebraaten | |
| 2018/0220237 A1 | 8/2018 | Tabatabai | |
| 2021/0385359 A1 | 12/2021 | Reid | |
| 2023/0011743 A1 | 1/2023 | Paes | |

FOREIGN PATENT DOCUMENTS

| | | |
|---|---|---|
| WO | WO202327561 | 5/2023 |

* cited by examiner

*Primary Examiner* — Disler Paul

(57) ABSTRACT

A home audio wiring assembly includes a plurality of outlet boxes that is each integrated into a respective wall in a building. A plurality of wall plates is provided and each of the plurality of wall plates has a plurality of sound holes to pass sound through the wall plates. Additionally, each of the plurality of wall plates is mountable to a respective one of the plurality of outlet boxes. A plurality of speakers is each attachable to a respective wall plate to emit audible sound outwardly through the plurality of sound holes in the respective wall plate. A central circuit box is integrated into the building and the central circuit box is in electrical communication between each of the plurality of speakers and an audio source thereby facilitating audio from the audio source to be audible throughout the building.

6 Claims, 8 Drawing Sheets

HOME AUDIO WIRING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to home audio devices and more particularly pertains to a new home audio device for retro-fitting speakers into unused outlet boxes in a building which are in electrical communication with an audio source for emitting audio from the audio source throughout the building. The device includes a plurality of wall plates that each has a plurality of sound holes and a plurality of speakers that are mountable to the wall plates. The device includes a central circuit box that is in electrical communication with each of the speakers and an audio source thereby facilitating the plurality of speakers to emit audio from the audio source.

(2) Description of Related Art Including Information Disclosed Under 37 CFR 1.97 and 1.98

The prior art relates to home audio devices including a variety of audio systems that can be incorporated into a structure that each includes speakers and a means of routing an audio signal from an audio source to each of the speakers. In no instance does the prior art disclose a home audio device that includes a plurality of wall plates that each has a plurality of sound holes and a plurality of speakers that are attachable to a respective wall plate and a central circuit box that is in electrical communication between each of the speakers and an audio source for emitting audio from the audio source throughout a building.

BRIEF SUMMARY OF THE INVENTION

An embodiment of the disclosure meets the needs presented above by generally comprising a plurality of outlet boxes that is each integrated into a respective wall in a building. A plurality of wall plates is provided and each of the plurality of wall plates has a plurality of sound holes to pass sound through the wall plates. Additionally, each of the plurality of wall plates is mountable to a respective one of the plurality of outlet boxes. A plurality of speakers is each attachable to a respective wall plate to emit audible sound outwardly through the plurality of sound holes in the respective wall plate. A central circuit box is integrated into the building and the central circuit box is in electrical communication between each of the plurality of speakers and an audio source thereby facilitating audio from the audio source to be audible throughout the building.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
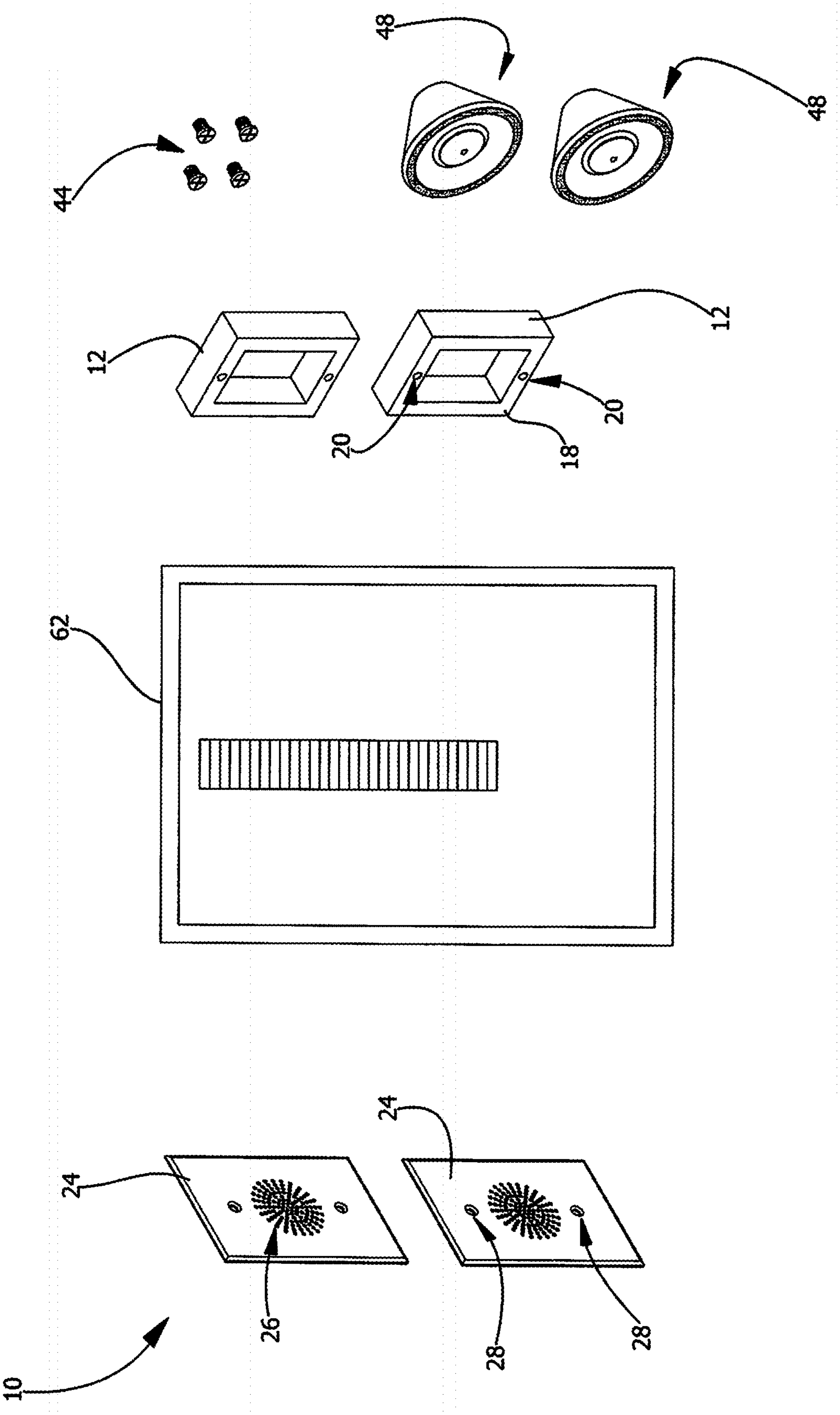
FIG. 1 is a perspective in-use view of a home audio wiring assembly according to an embodiment of the disclosure.
Figure 2:
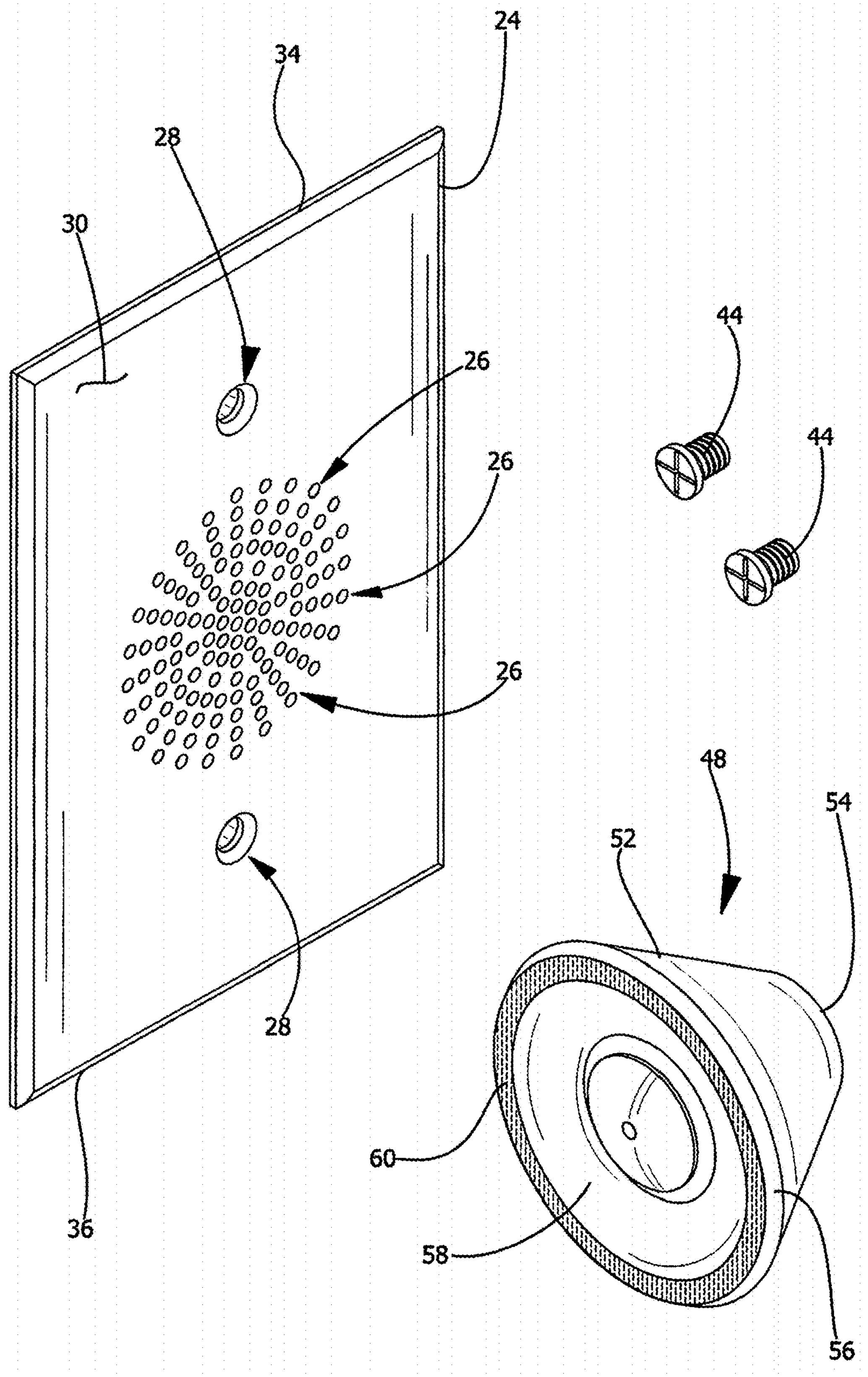
FIG. 2 is a front perspective view of an embodiment of the disclosure.
Figure 3:
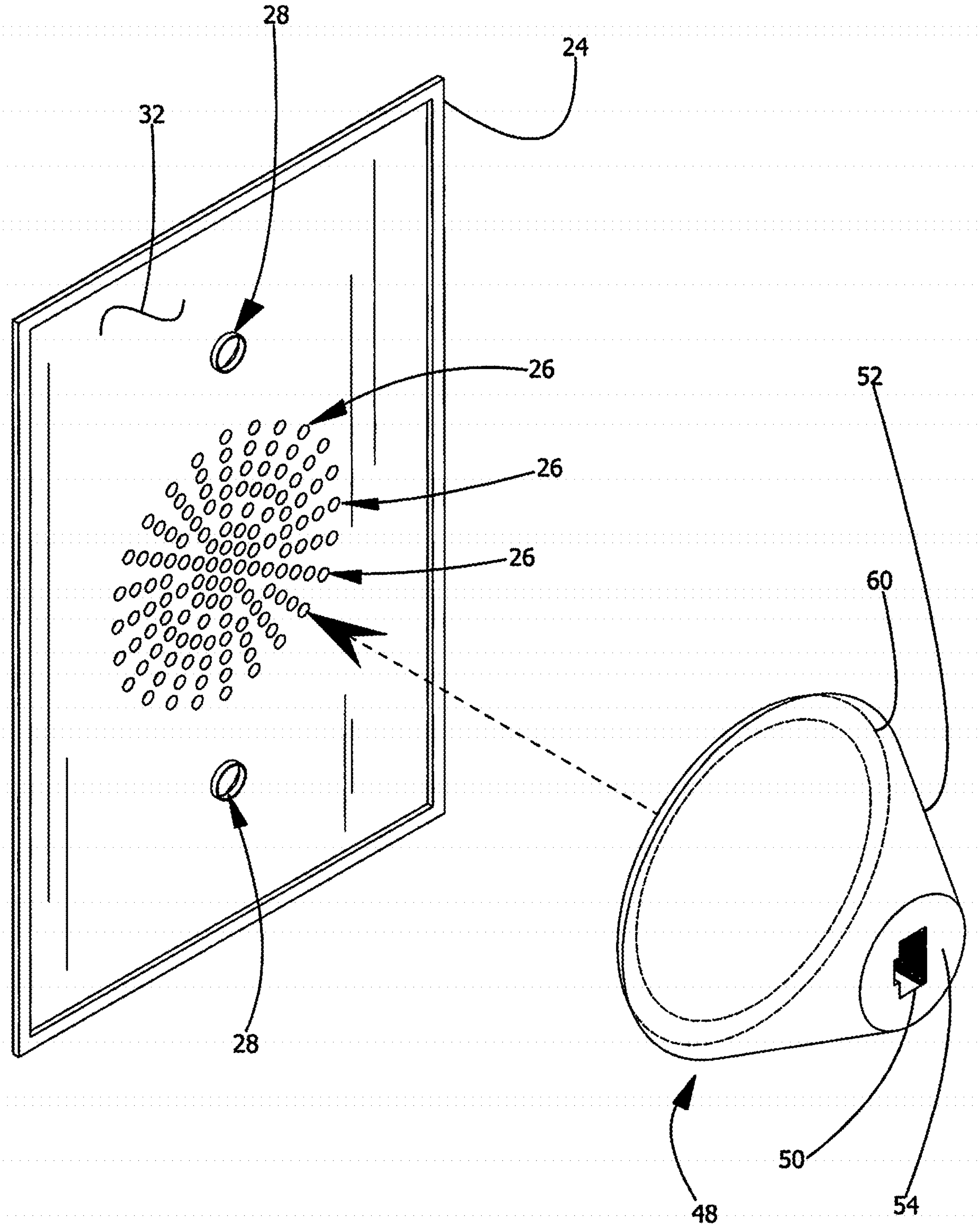
FIG. 3 is a back exploded perspective view of an embodiment of the disclosure.
Figure 4:
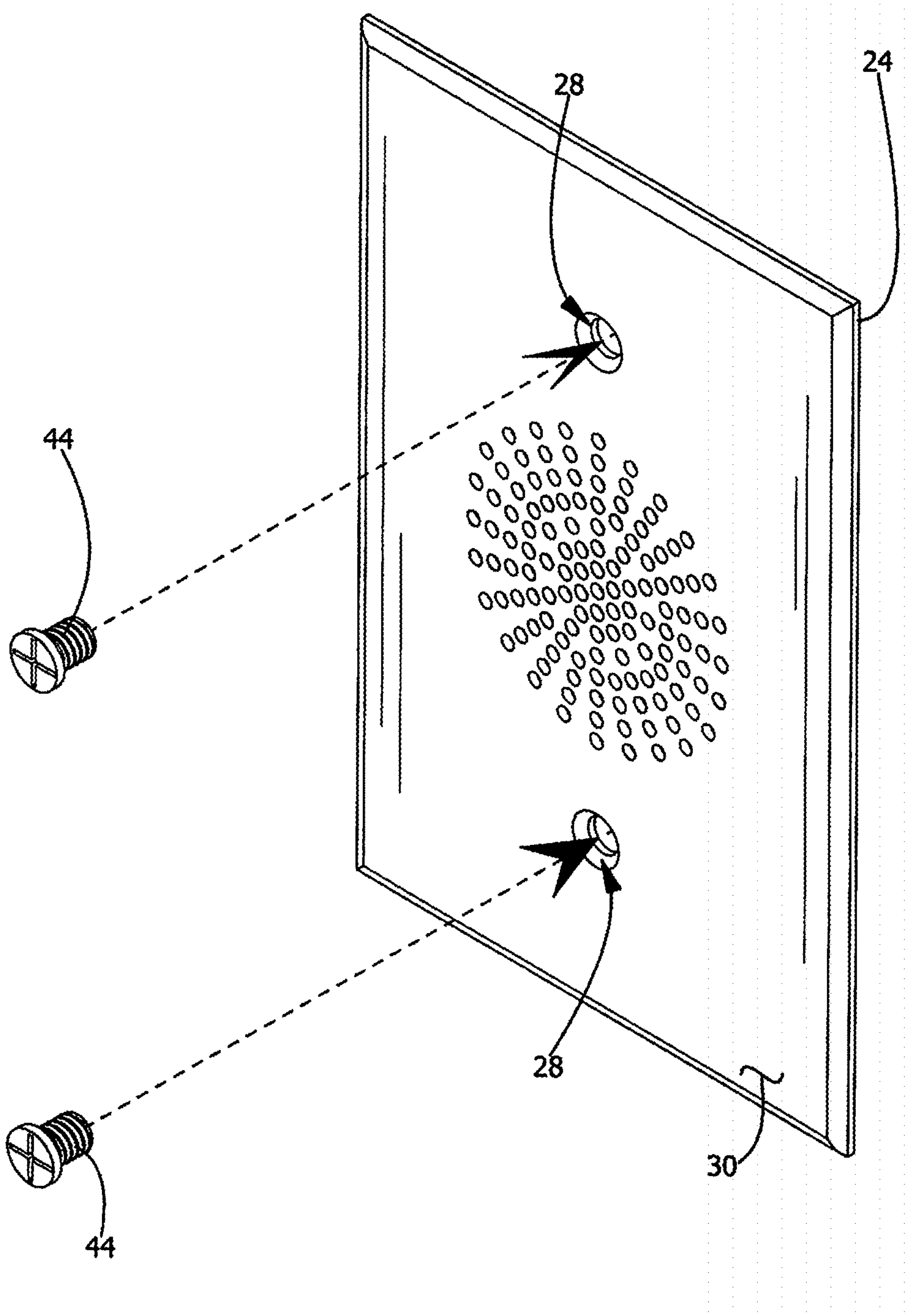
FIG. 4 is a front exploded perspective view of an embodiment of the disclosure.
Figure 5:
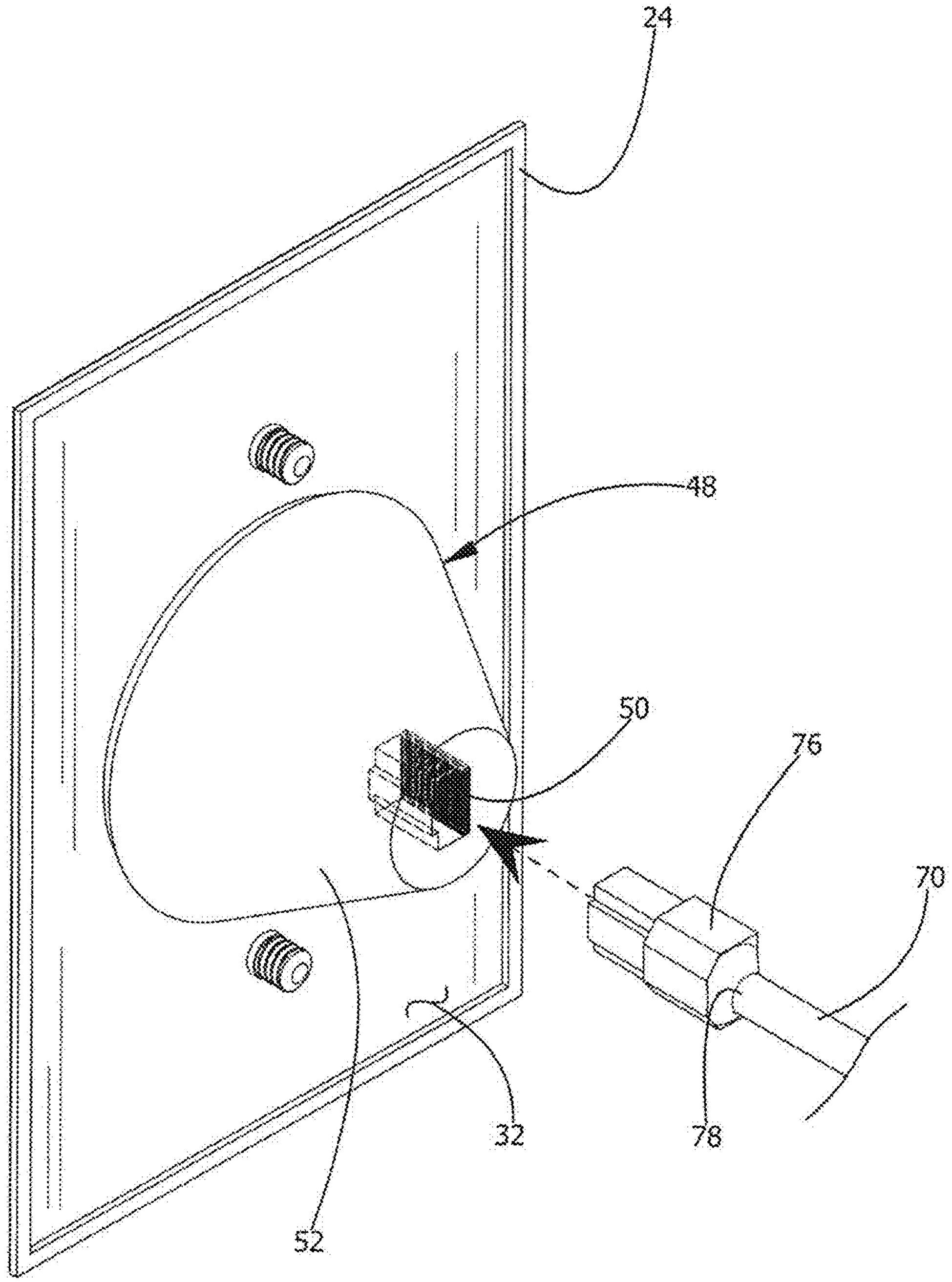
FIG. 5 is a back perspective view of an embodiment of the disclosure.

With reference now to the drawings, and in particular to FIGS. 1 through 8 thereof, a new home audio device embodying the principles and concepts of an embodiment of the disclosure and generally designated by the reference numeral 10 will be described.

As best illustrated in FIGS. 1 through 8, the home audio wiring assembly 10 generally comprises a plurality of outlet boxes 12 and each of the plurality of outlet boxes 12 is integrated into a respective wall 14 in a building 16. The building 16 may be a house, an apartment or any other type of occupancy and each of the plurality of outlet boxes 12 may comprise a telephone outlet box, an ethernet port box or any other type of communication outlet box that was previously installed in the building 16 and is no longer being used. Additionally, each of the plurality of outlet boxes 12 has a front edge 18 that is aligned with an exposed surface 19 of the respective wall 14 and a pair of fastener wells 22 that is each aligned with the front edge 18.

A plurality of wall plates 24 is provided and each of the plurality of wall plates 24 has a plurality of sound holes 26 to pass sound through the wall plates 24 and each of the plurality of wall plates 24 is mountable to a respective one of the plurality of outlet boxes 12. Each of the plurality of wall plates 24 has a pair of fastener holes 28 which each extends through a front surface 30 and a back surface 32 of a respective wall plate 24 and each of the sound holes 26 in a respective wall plate 24 extends through the front surface 30 and the back surface 32 of the respective wall plate 24. The plurality of sound holes 26 in each of the plurality of wall plates 24 is arranged in a plurality of lines radiating outwardly from a central point such that the plurality of sound holes 26 in each of the plurality of wall plates 24 defines a circular shape.

Figure 6:
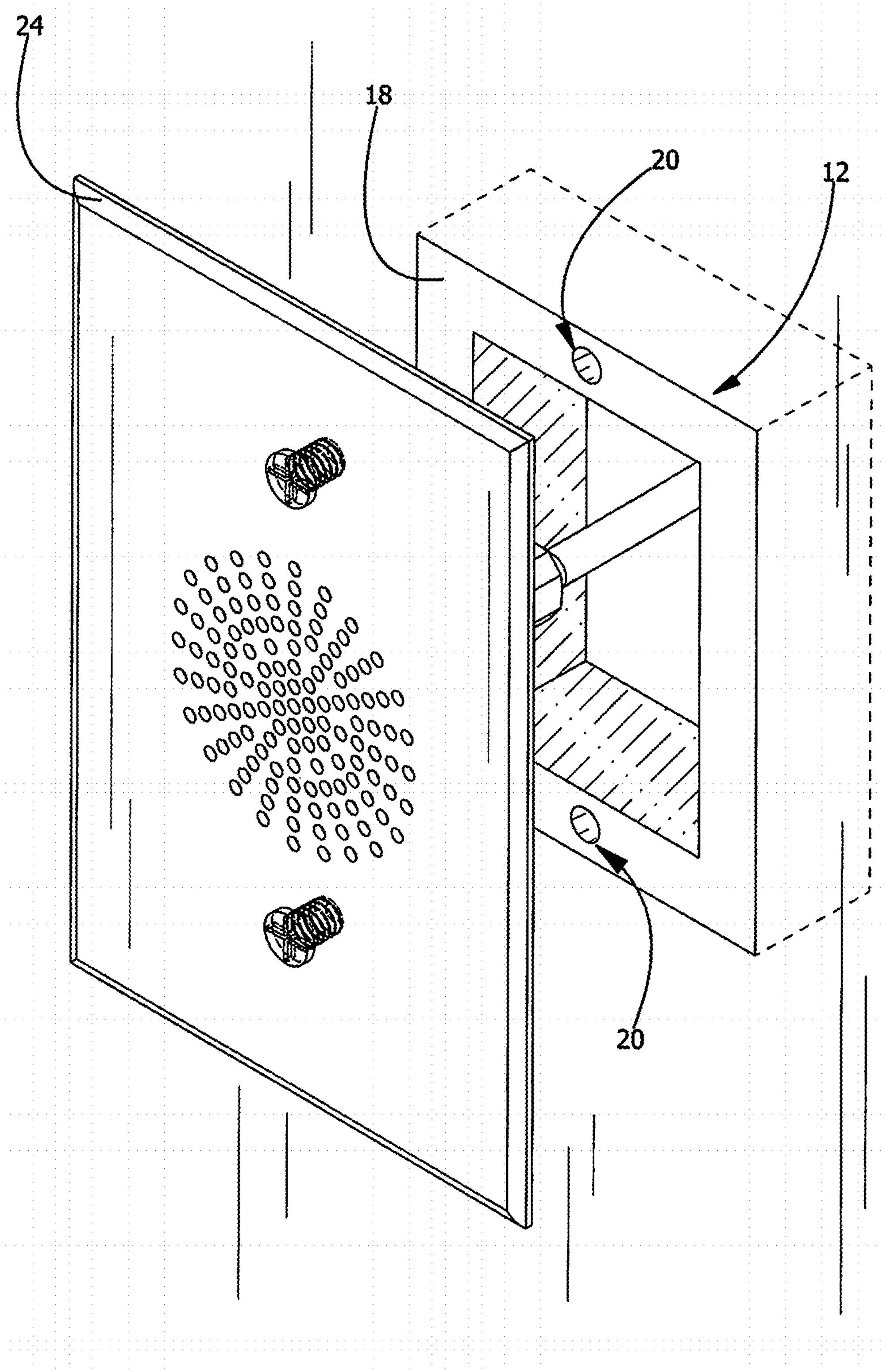
FIG. 6 is an exploded in-use view of an embodiment of the disclosure showing a wall plate being attached to an outlet box.
Figure 7:
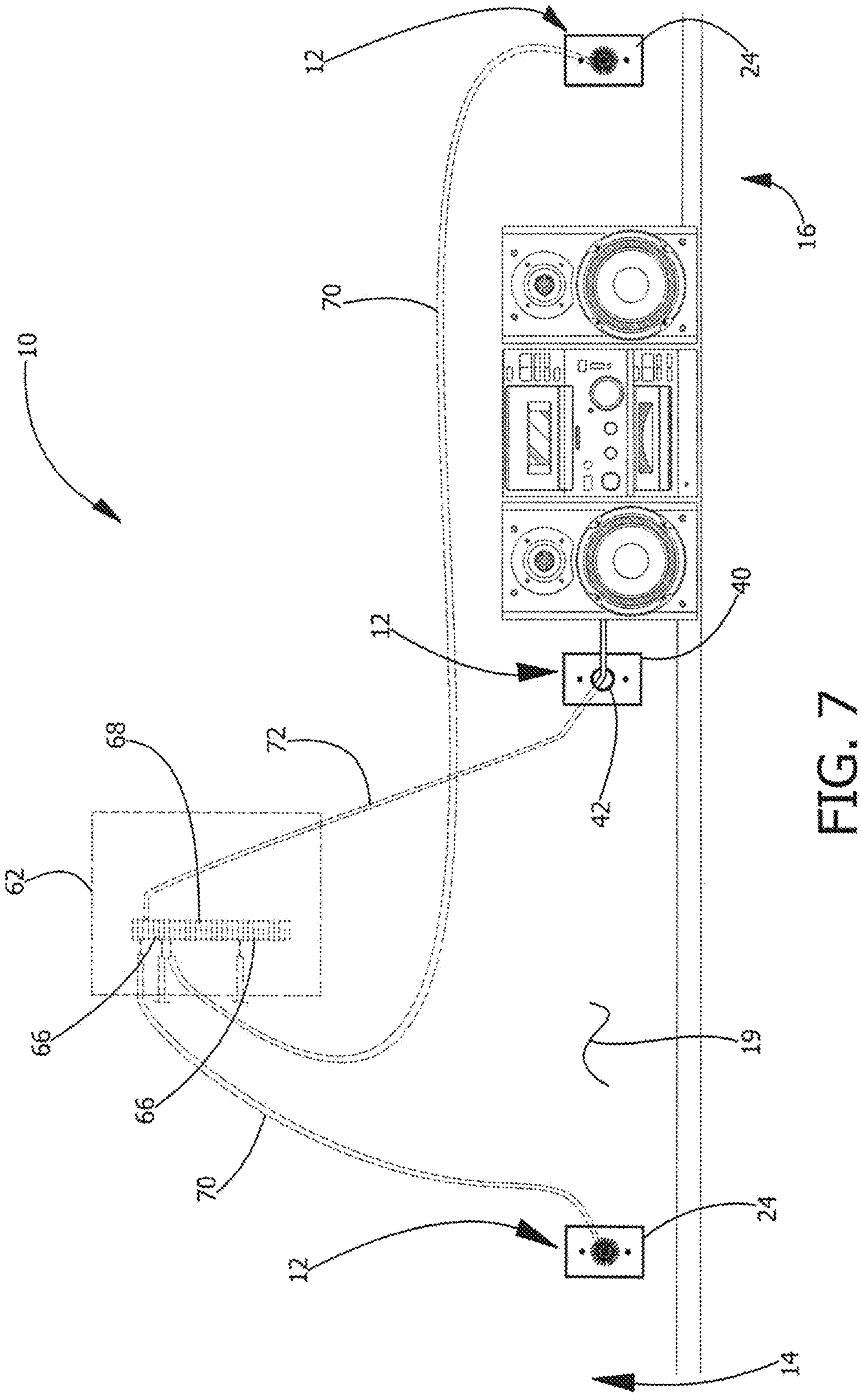
FIG. 7 is a perspective view of an embodiment of the disclosure.
Figure 8:
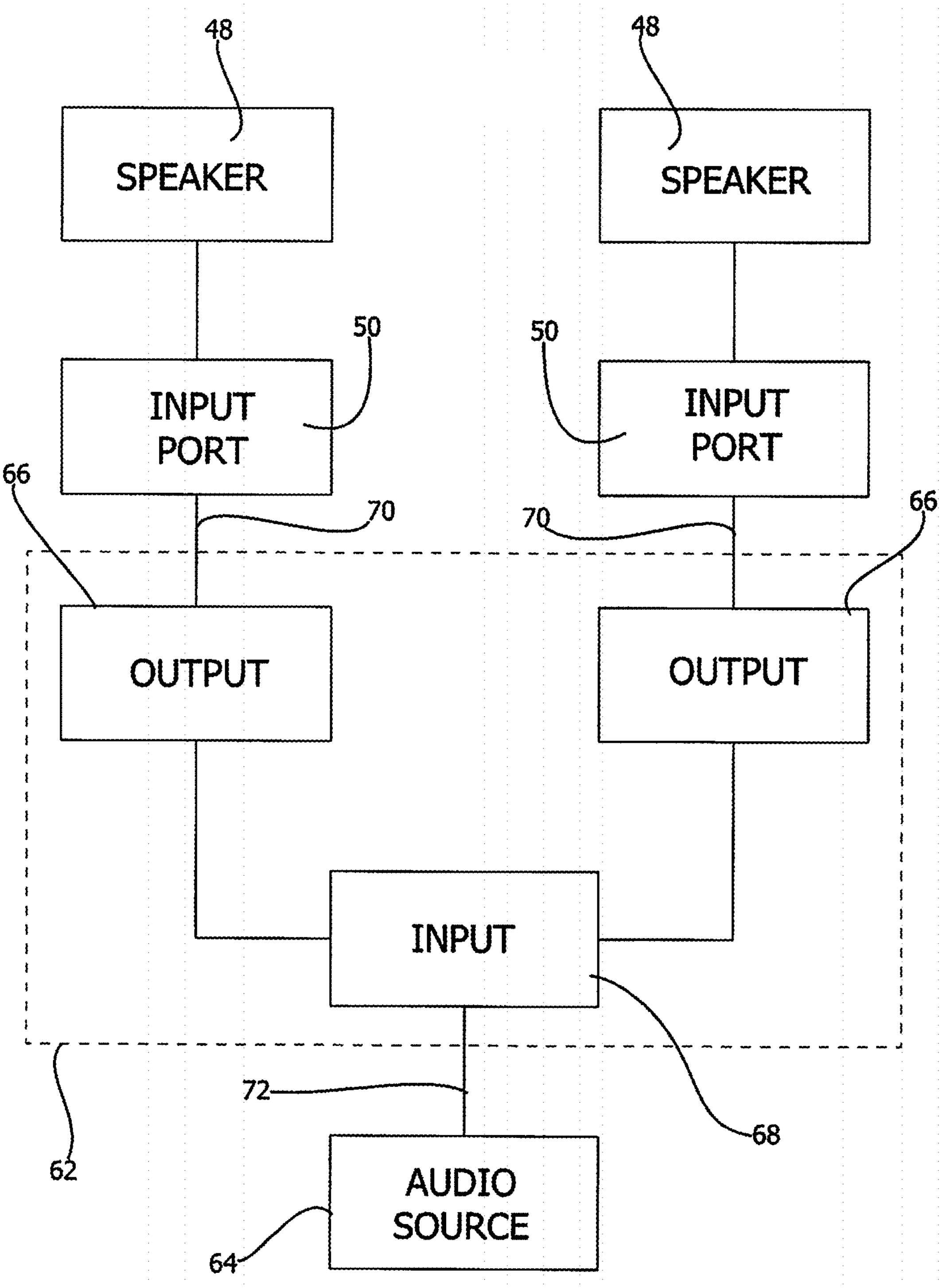
FIG. 8 is a schematic view of an embodiment of the disclosure.

The plurality of sound holes 26 in each of the plurality of wall plates 24 is centrally located on the wall plates 24 and each of the pair of fastener holes 28 in a respective wall plate 24 is positioned between the plurality of sound holes 26 in the respective wall plate 24 and a respective one of a top edge 34 and a bottom edge 36 of the respective wall plate 24. Additionally, each of the pair of fastener holes 28 in a respective wall plate 24 is aligned with a respective one of the fastener wells 22 in a respective one of the outlet boxes 12 when the respective wall plate 24 is positioned over the respective outlet box 12. As is shown in FIG. 6, the plurality of wall plates 24 includes an input plate 40 and the input plate 40 has an aperture 42 extending through the front surface 30 and the back surface 32 of the input plate 40 in lieu of the plurality of sound holes 26. A plurality of fasteners 44 is provided and each of the fasteners 44 is extendable through a respective one of the fastener holes 28 in a respective wall plate 24 to engage a respective fastener well 22 in a respective outlet box 12 for securing the respective wall plate 24 to the respective outlet box 12.

A plurality of speakers 48 is provided and each of the plurality of speakers 48 is attached to a respective one of the plurality of wall plates 24. In this way the plurality of speakers 48 can emit audible sound outwardly through the plurality of sound holes 26 in the respective wall plate 24. Additionally, each of the plurality of speakers 48 has an input port 50. Each of the plurality of speakers 48 comprises a conical housing 52 that has a rear end 54 and a front end 56. The conical housing 52 flares outwardly between the rear end 54 and the front end 56 and each of the rear end 54 and the front end 56 is planar. The input port 50 is recessed into the rear end 54 of the conical housing 52 and the input port 50 may comprise an ethernet port, a telephony port or other type of input port 50 that would commonly be associated with communications. Each of the speakers 48 includes a diaphragm 58 that is integrated into the front end 56 to emit audible sound outwardly from the conical housing 52 and the diaphragm 58 is in electrical communication with the input port 50. Each of the speakers 48 includes an adhesive strip 60 that is applied to the front end 56 of the conical housing 52 which surrounds the diaphragm 58 and which adhesively engages the back surface 32 of the respective wall plate 24 for mounting the speaker 48 to the wall plate 24.

A central circuit box 62 is provided and the central circuit box 62 is integrated into the building 16. The central circuit box 62 is in electrical communication with the input port 50 on each of the plurality of speakers 48. The central circuit box 62 is in electrical communication with an audio source 64 thereby facilitating the central circuit box 62 to communicate an audio signal to each of the plurality of speakers 48. In this way the plurality of speakers 48 facilitate audio from the audio source 64 to be audible throughout the building 16. Additionally, the central circuit box 62 has a plurality of outputs 66 and an input 68 and each of the plurality of outputs 66 is in electrical communication with the input 68. The audio source 64 may comprise a home stereo system or the like which has an analog output and does not employ wireless connectivity.

A plurality of output conductors 70 is included and each of the plurality of output conductors 70 is electrically coupled between a respective one of the plurality of outputs 66 on the central circuit box 62 and the input port 50 on a respective one of the plurality of speakers 48. An input conductor 72 is electrically coupled between the input 68 on the central circuit box 62 and an output 74 of the audio source 64 thereby facilitating the output 74 of the audio source 64 to be in electrical communication with the input port 50 of each of the plurality of speakers 48. The input conductor 72 extends through the aperture 42 in the input wall plate 40 thereby facilitating the input conductor 72 to be electrically coupled to the output of the audio source 64. As is most clearly shown in FIG. 4, each of the output conductors 70 includes an output plug 76 that is electrically coupled to a first end 78 of the output conductors 70 which is electrically matable to the input port 50 on the respective speaker 48.

In use, the central circuit box 62 is installed in a desired location within the building 16 and each of the output conductors 70 is routed between the central circuit box 62 and a respective one of the plurality of outlet boxes 12 such that the output plug on each of the output conductors 70 is positioned inside of the respective outlet box 12. The input conductor 72 is routed between the central circuit box 62 and the input wall plate 40 such that the input conductor 72 extends through the aperture 42 in the input wall plate 40. The output plug 76 on each of the output conductors 70 is mated to the input port 50 on a respective speaker 48 and each of the wall plates 24 is mounted to a respective outlet box 12. The adhesive strip 60 on the conical housing 52 of each of the plurality of speakers 48 is adhered to the back surface 32 of a respective one of the wall plates 24 such that the speaker 48 is aligned with the plurality of sound holes 26 in the respective wall plate 24. Furthermore, each of the wall plates 24 is attached to a respective outlet box 12 such that each of the speakers 48 is positioned within the respective outlet box 12. The input conductor 72 is electrically coupled to the output 74 of the audio source 64 to facilitate each of the plurality of speakers 48 to emit audible sounds outwardly through the plurality of sound holes 26 in the respective wall plate 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A home audio wiring assembly for employing existing electrical outlet boxes in a building for housing audio speakers which are in communication with a central circuit for playing audio from an audio source throughout the building, said assembly comprising:

a plurality of outlet boxes, each of said plurality of outlet boxes being integrated into a respective wall in a building;

a plurality of wall plates, each of said plurality of wall plates having a plurality of sound holes wherein said plurality of sound holes in each of said plurality of wall plates is configured to pass sound through said wall plates, each of said plurality of wall plates being mountable to a respective one of said plurality of outlet boxes;

a plurality of speakers, each of said plurality of speakers being attached to a respective one of said plurality of wall plates wherein each of said plurality of speakers is configured to emit audible sound outwardly through said plurality of sound holes in said respective wall plate, each of said plurality of speakers having an input port; and a central circuit box, said central circuit box being integrated into the building, said central circuit box being in electrical communication with said input port on each of said plurality of speakers, said central circuit box being in electrical communication with an audio source thereby facilitating said central circuit box to communicate an audio signal to each of said plurality of speakers wherein said plurality of speakers is configured to facilitate audio from said audio source to be audible throughout the building;

wherein each of said plurality of speakers comprising a conical housing having a rear end and a front end, said conical housing flaring outwardly between said rear end and said front end, each of said rear end and said front end being planar, said input port being recessed into said rear end of said conical housing, and a diaphragm being integrated into said front end wherein said diaphragm is configured to emit audible sound outwardly from said conical housing, said diaphragm being in electrical communication with said input port.

2. The assembly according to claim 1, wherein:

each of said plurality of outlet boxes has a front edge being aligned with an exposed surface of the respective wall and a pair of fastener wells each being aligned with said front edge;

each of said plurality of wall plates has a pair of fastener holes which each extends through a front surface and a back surface of a respective wall plate;

each of said sound holes in a respective wall plate extends through said front surface and said back surface of said respective wall plate;

each of said pair of fastener holes in a respective wall plate being positioned between said plurality of sound holes in said respective wall plate and a respective one of a top edge and a bottom edge of said respective wall plate; and each of said pair of fastener holes in a respective wall plate being aligned with a respective one of said fastener wells in a respective one of said outlet boxes when said respective wall plate is positioned over said respective outlet box.

3. The assembly according to claim 2, wherein:

said plurality of sound holes in each of said plurality of wall plates is arranged in a plurality of lines radiating outwardly from a central point such that said plurality of sound holes in each of said plurality of wall plates defines a circular shape; and said plurality of sound holes in each of said plurality of wall plates is centrally located on said wall plates.

4. The assembly according to claim 1, wherein said plurality of wall plates includes an input plate, said input plate having an aperture extending through a front surface and a back surface of said input plate in lieu of said plurality of sound holes.

5. The assembly according to claim 4, wherein:

said central circuit box has a plurality of outputs and an input;

said assembly includes a plurality of output conductors, each of said plurality of output conductors being electrically coupled between a respective one of said plurality of outputs on said central circuit box and said input port on a respective one of said plurality of speakers; and said assembly includes an input conductor being electrically coupled between said input on said central circuit panel and an output of said audio source thereby facilitating said output of said audio source to be in electrical communication with said input port of each of said plurality of speakers, said input conductor extending through said aperture in said input wall plate thereby facilitating said input conductor to be electrically coupled to said output of said audio source.

6. A home audio wiring assembly for employing existing electrical outlet boxes in a building for housing audio speakers which are in communication with a central circuit for playing audio from an audio source throughout the building, said assembly comprising:

a plurality of outlet boxes, each of said plurality of outlet boxes being integrated into a respective wall in a building, each of said plurality of outlet boxes having a front edge being aligned with an exposed surface of the respective wall and a pair of fastener wells each being aligned with said front edge;

a plurality of wall plates, each of said plurality of wall plates having a plurality of sound holes wherein said plurality of sound holes in each of said plurality of wall plates is configured to pass sound through said wall plates, each of said plurality of wall plates being mountable to a respective one of said plurality of outlet boxes, each of said plurality of wall plates having a pair of fastener holes which each extends through a front surface and a back surface of a respective wall plate, each of said sound holes in a respective wall plate extending through said front surface and said back surface of said respective wall plate, said plurality of sound holes in each of said plurality of wall plates being arranged in a plurality of lines radiating outwardly from a central point such that said plurality of sound holes in each of said plurality of wall plates defines a circular shape, said plurality of sound holes in each of said plurality of wall plates being centrally located on said wall plates, each of said pair of fastener holes in a respective wall plate being positioned between said plurality of sound holes in said respective wall plate and a respective one of a top edge and a bottom edge of said respective wall plate, each of said pair of fastener holes in a respective wall plate being aligned with a respective one of said fastener wells in a respective one of said outlet boxes when said respective wall plate is positioned over said respective outlet box, said plurality of wall plates including an input plate, said input plate having an aperture extending through said front surface and said back surface of said input plate in lieu of said plurality of sound holes;

a plurality of speakers, each of said plurality of speakers being attached to a respective one of said plurality of wall plates wherein each of said plurality of speakers is configured to emit audible sound outwardly through said plurality of sound holes in said respective wall plate, each of said plurality of speakers having an input port, each of said plurality of speakers comprising:

a conical housing having a rear end and a front end, said conical housing flaring outwardly between said rear end and said front end, each of said rear end and said front end being planar, said input port being recessed into said rear end of said conical housing; and a diaphragm being integrated into said front end wherein said diaphragm is configured to emit audible sound outwardly from said conical housing, said diaphragm being in electrical communication with said input port;

a central circuit box, said central circuit box being integrated into the building, said central circuit box being in electrical communication with said input port on each of said plurality of speakers, said central circuit box being in electrical communication with an audio source thereby facilitating said central circuit box to communicate an audio signal to each of said plurality of speakers wherein said plurality of speakers is configured to facilitate audio from said audio source to be audible throughout the building, said central circuit box having a plurality of outputs and an input;

a plurality of output conductors, each of said plurality of output conductors being electrically coupled between a respective one of said plurality of outputs on said central circuit box and said input port on a respective one of said plurality of speakers; and an input conductor being electrically coupled between said input on said central circuit panel and an output of said audio source thereby facilitating said output of said audio source to be in electrical communication with said input port of each of said plurality of speakers, said input conductor extending through said aperture in said input wall plate thereby facilitating said input conductor to be electrically coupled to said output of said audio source.

* * * * *